United States Patent [19]

Dvorkis et al.

[11] Patent Number: 5,561,283
[45] Date of Patent: Oct. 1, 1996

[54] LASER SCANNING SYSTEM AND SCANNING METHOD FOR READING BAR CODES

[75] Inventors: Paul Dvorkis, Stony Brook; Edward Barkan, Miller Place; Harold Charych, East Setauket; James Giebel, East Northport; Stephen Osterweil, Plainview; Sundeep Kumar, East Setauket; John Barile, Holbrook; Paul R. Poloniewicz, East Setauket; Anthony D. Biuso, South Setauket; Steven M. Chew, East Northport, all of N.Y.

[73] Assignee: Symbol Technologies, Inc., Holtsville, N.Y.

[21] Appl. No.: 332,581

[22] Filed: Oct. 31, 1994

Related U.S. Application Data

[63] Continuation-in-part of Ser. No. 294,438, Aug. 23, 1994, abandoned, which is a continuation of Ser. No. 37,143, Mar. 25, 1993, abandoned, which is a division of Ser. No. 715,267, Jun. 14, 1991, Pat. No. 5,235,167, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.$^6$ ................................................. G06K 7/16
[52] U.S. Cl. .................................... 235/462; 235/470
[58] Field of Search .................................... 235/462, 470

[56] References Cited

U.S. PATENT DOCUMENTS

| | | | |
|---|---|---|---|
| 4,251,798 | 2/1981 | Swartz et al. | 340/146.3 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,387,298 | 6/1983 | Petersen et al. | 235/462 |
| 4,409,470 | 10/1983 | Shepard et al. | 235/472 |
| 4,460,120 | 7/1984 | Shepard et al. | 235/472 |
| 4,760,248 | 7/1988 | Swartz et al. | 235/472 |
| 4,794,239 | 12/1988 | Allais | 235/462 |
| 4,896,026 | 1/1990 | Krichever et al. | 235/472 |
| 4,933,538 | 6/1990 | Heiman et al. | 235/462 |
| 5,115,121 | 5/1992 | Bianco et al. | 235/467 |
| 5,117,098 | 5/1992 | Swartz | 235/472 |
| 5,168,149 | 12/1992 | Dvorkis et al. | 235/472 |
| 5,229,591 | 7/1993 | Heiman et al. | 235/472 |
| 5,235,167 | 8/1993 | Dvorkis et al. | 235/462 |
| 5,280,165 | 1/1994 | Dvorkis et al. | 235/470 |

*Primary Examiner*—John Shepperd
*Attorney, Agent, or Firm*—Finnegan, Henderson, Farabow, Garrett and Dunner, L.L.P.

[57] ABSTRACT

A scanner determines whether a target is a bar code symbol and, if so, whether that symbol is one-dimensional or two-dimensional. For two-dimensional symbols, the scanner aligns a scanning pattern with the symbol and expands the scanning pattern to reach only to the top and bottom edges of the symbol, not beyond. The scanner also has a microprocessor-control scanning engine that uses a coil to drive a scanning element and pick up feed back signals from the scanning element. A pulse-width-modulated regulator also provides fast and efficient operation for driving the coil. The scanning engine can also be designed to generate a pattern that precesses across the target, and a powerful interface to the scanning engine allows decoding and control logic to work efficiently with and independently of the scan engine.

13 Claims, 12 Drawing Sheets

LASER SCANNING SYSTEM AND SCANNING METHOD FOR READING BAR CODES

RELATED PATENTS AND APPLICATIONS

This application is a continuation-in-part of U.S. patent application Ser. No. 08/294,438, filed Aug. 23, 1994, now abandoned which is a continuation of Ser. No. 08/037143, filed Mar. 25, 1993 (abandoned), which is a division of U.S. patent application Ser. No. 07/715,267, filed Jun. 14, 1991, now U.S. Pat. No. 5,235,167, which in turn is a continuation-in-part of U.S. patent application Ser. No. 07/506,674, filed Apr. 9, 1990 (abandoned), which in turn is a continuation of Ser. No. 07/260,692, filed Oct. 21, 1988, now U.S. Pat. No. 4,933,538. This application is also related to U.S. patent application Ser. No. 818,731, filed Jan. 6, 1992, now U.S. Pat. No. 5,229,591, which was a continuation of Ser. No. 506,674. This application is further related to U.S. patent application Ser. No. 317,433, filed Mar. 1, 1989; to U.S. patent application Ser. No. 520,464, filed May 8, 1990, which issued as U.S. Pat. No. 5,168,149; and U.S. patent application Ser. No. 544,628, filed Jun. 27, 1990, which issued as U.S. Pat. No. 5,117,098. All of these applications and patents have been assigned to Symbol Technologies, Inc.

BACKGROUND OF THE INVENTION

This invention relates generally to the design of scanning systems for reading bar code symbols or similar indicia, and more particularly, to scanning both one-dimensional and two-dimensional bar codes symbols automatically. Most conventional optical scanning systems can read either one-dimensional or two-dimensional bar code symbols. A bar code symbol is a coded pattern of indicia having a series of variable-width bars separated by variable-width spaces, the bars and spaces having different light-reflecting characteristics. One example of a one-dimensional bar code is the UPC/EAN code currently in use for identifying articles and other information. One example of a two-dimensional, or stacked, bar code is the PDF417 bar code described in U.S. Pat. No. 5,159,639, which is incorporated herein by reference.

Most scanning systems, or scanners, generate a beam of light which reflects off a bar code symbol so the scanning system can receive the reflected light. The system then transforms that; reflected light into electrical signals, and decodes those electrical signals to extract the information embedded in the bar code symbol. Scanning systems of this general type are described in U.S. Pat. Nos. 4,251,798; 4,360,798; 4,369,361; 4,387,297; 4,409,470; and 4,460,120, all of which have been assigned to Symbol Technologies, Inc.

Because both one-dimensional symbols and two-dimensional symbols are currently being used, it would be simpler and more efficient if a single scanning system could not only distinguish a bar code symbol from other markings, such as text, but also decode the symbol whether it is one-dimensional or two-dimensional. This operation is particularly important when the bar code symbol is skewed relative to the scanning patterns of the scanner.

An additional problem for such scanning systems occurs when decoding two-dimensional bar code symbols. These symbols do not all have the same height, so the scanning system must expand its scanning pattern to cover the entire two-dimensional symbol. Some conventional systems do this, but sometimes cover areas outside of the symbol. Although, using such a large pattern does not affect the accuracy of the scanner, it is inefficient. The portions of the scanning pattern which lay outside the bar code symbol are useless, and scanning these areas slows down the scanning operation. In addition, forcing the scanning pattern to be too large reduces the accuracy of decoding the two-dimensional bar code symbol.

Building a system, to overcome these problems is not only difficult, it is complicated by an additional concern. Scanners should not become any larger for ergonometric and, economic reasons. Thus, more powerful and flexible scanning devices must be compact.

Another concern is speed. The additional processing needed for increased, efficiency and flexibility must not come at the expense of speed. That processing must therefore proceed quickly and efficiently.

Yet another concern is the need to ensure that the different scanner subsystems communicate with each other effectively as they become more robust. Scanning systems typically have different subsystems, such as the scanning engine, the optical sensor, and the decoder. The interfaces between these different subsystems must support the required processing power and allow one to improve one part a scanning system without redesigning other systems.

To obtain a scanner with all these features is very difficult indeed. The fast-increasing use of bar codes, however, demands that scanning systems have increasing flexibility, robustness, and efficiency.

It is therefore an object of this invention to provide a scanner capable of differentiating between one-dimensional, and two-dimensional bar codes, and of decoding them automatically and appropriately even if they are not initially aligned with the scanner.

It is also an object of the invention to ensure that the scanning pattern can precess to change the location of the scan lines.

It is another object of the invention to adjust the height of the scanning patterns automatically to ensure that the scanning pattern covers the entire symbol without extending outside the symbol.

A further object of the invention is to provide a fast but compact scanning engine to generate scanning patterns for both one-dimensional and two-dimensional bar codes.

It is also an object of the invention to have such a scanning engine adapt itself to the different characteristics of the scanning elements.

It is a further object of the present invention to have such a powerful and flexible scanning engine communicate with the remainder of the scanner over a robust and flexible interface.

SUMMARY OF INVENTION

To achieve these objects, the present invention provides a system for examining the optical reflections to determine whether a sensed target is a bar code symbol and, if so, whether that symbol is a one-dimensional or two-dimensional code. If the symbol is a two-dimensional code, the present invention aligns the two-dimensional scanning pattern with the symbol and expands the pattern to the top and bottom edges of the symbol.

A bar code reader according to this invention for reading a bar code symbol having a defined boundary comprises a light beam scanner for directing a light beam toward a target in a predetermined pattern; a detector for receiving portions of the light beam reflected from the target and generating electrical signals representing the received, reflected light beam; identifier means for determining whether the target is a bar code symbol; and feedback means, responsive to the electric signals, for controlling the scanner to conform the shape of the predetermined pattern to the boundary of the target if it is a bar code symbol.

A method for reading a bar code symbol according to this invention includes directing a raster scan pattern towards a target and receiving reflected light from the target. Electrical signals are generated representing the widths of bars and spaces of a bar and space pattern of the target based on the reflected light, and it is determined whether the target is a bar code symbol. The height of the raster scan pattern is then increased to conform to the shape of the target if the target is a bar code symbol.

BRIEF DESCRIPTION OF DRAWINGS

The accompanying drawings provide a further understanding of the invention and, together with the description, explain the principles of the invention.

DESCRIPTION OF THE PREFERRED IMPLEMENTATIONS

Figure 1:
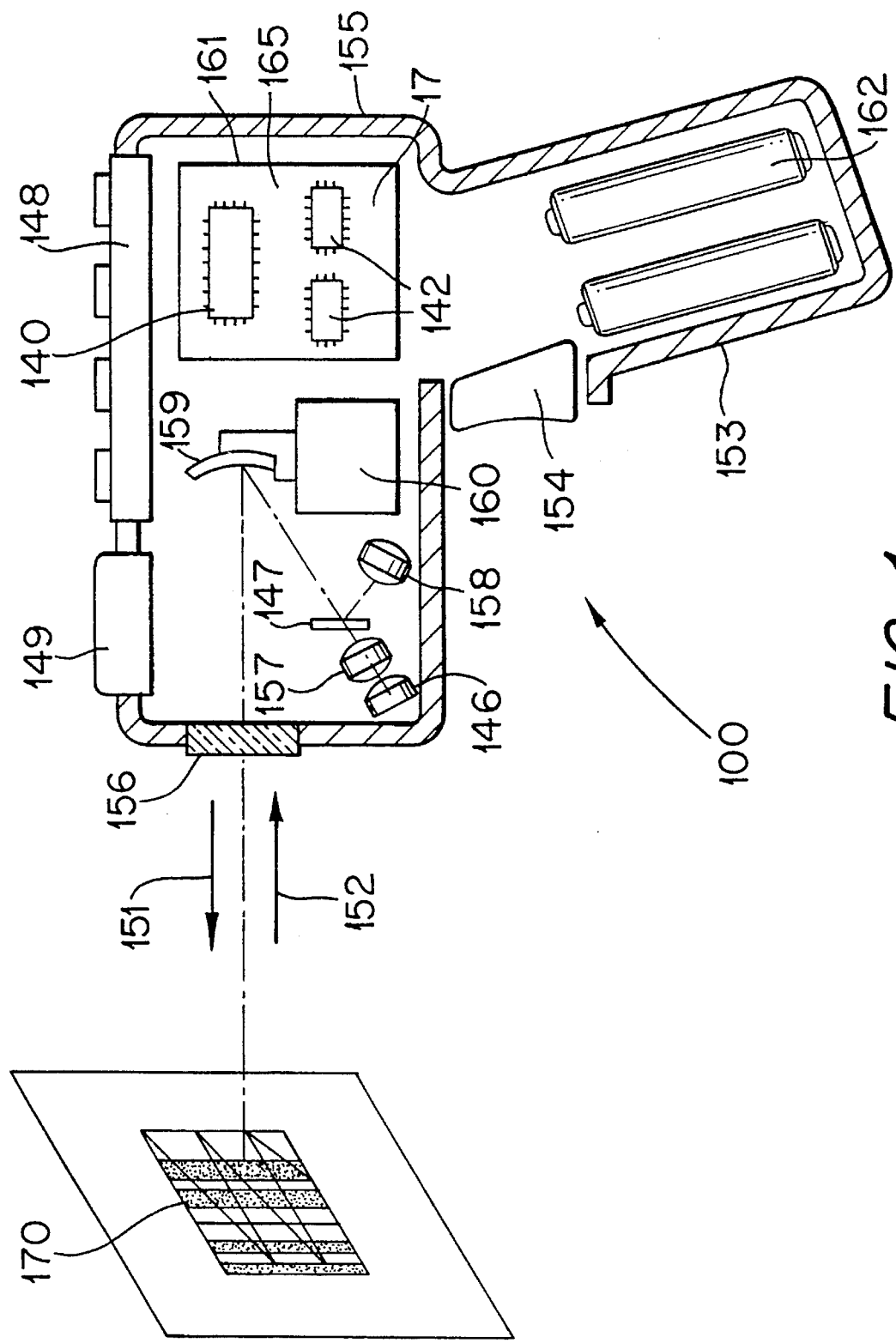
FIG. 1 is simplified diagrammatic representation of one embodiment a laser scanning system according to this invention.

The following description of the preferred implementations of this invention do not describe all possible implementations. In the description, like reference numerals in different figures refer to like parts, unless indicated otherwise.

A. Overview

Unless the context or specific instructions indicate otherwise, the terms "symbol" and "bar code" should be construed broadly in this specification and the following claims. For example, those terms cover any number of patterns having alternating bars and spaces, including those of various widths, and one-dimensional or two-dimensional graphic patterns other than those specifically mentioned.

The present invention relates to scanning systems including those that can automatically initiate and terminate scanning of a target. Some scanning systems with this automatic capability use a manually-operated trigger to initiate scanning of the target, such as U.S. Pat. No. 4,387,297 describes. Although the trigger is important for many applications, some applications benefit from other techniques, and this invention includes such techniques.

FIG. 1 shows a highly simplified embodiment of a bar code scanner 100 that may be constructed according to the principles of the present invention. Although FIG. 1 shows scanner 100 as hand-held, the invention does not require that the scanner be in this form. For example, the scanner could include a desktop workstation or have some other type of stationary architecture. Scanner 100 may also function as a portable computer terminal and include a keyboard 148 and a display 149, such as described in U.S. Pat. No. 4,409,470.

Hand-held scanner 100 of FIG. 1 has the style described generally in U.S. Pat. Nos. 4,760,248 or 4,896,026, both assigned to Symbol Technologies, Inc. Scanner 100 also has a similar design to the bar code reader commercially available as part number LS 8100 or LS 2000 from Symbol Technologies, Inc.

A user aims scanner 100 at bar code symbol 170 without physically touching it. Typically, scanner 100 operates several inches from the bar code symbol being read.

To construct scanner 100, the ordinary-skilled artisan may refer to U.S. Pat. Nos. 4,387,297; 4,409,470; 4,760,248; 4,896 026; and 4,387,298, all of which are incorporated herein by reference. To assist in the understanding of the claimed invention, however, the major features of scanner 100 are described below.

Scanner 100 is preferably gun-shaped in a housing 155 having a pistol-grip handle 153. A movable trigger 154 on handle 153 allows a user to activate a light beam 151 and associated detector circuitry when the user has pointed scanner 100 at a symbol 170.

Housing 155 which is preferably made of lightweight plastic, contains laser light source 146 (which may be a semiconductor laser diode or other light source), lens 157, partially-silvered mirror 147, detector 158, oscillating mirror 159, motor 160, power source (battery) 162, and signal processing and, control circuitry 165. Circuitry 165 includes CPU 140 and decoding and control electronics 142 on a printed circuit board 161.

When a user activates scanner 100 by pulling trigger 154, light source 146 generates light beam 151 along the axis of lens 157. Lens 157, which is not necessary in all embodiments, may be a single lens or a multiple lens system. After passing through lens 157, beam 151 passes through partially-silvered mirror 147 and, if desired, other lenses, or beam-shaping structures. Beam 151 then strikes oscillating mirror 159 driven by scanning motor 160, which together direct beam 151 in a scanning pattern. Preferably, motor 160 also starts when the user pulls trigger 154.

If light beam 151 is invisible, the optical system may include an aiming light parallel to beam 151 to help the user aim scanner 100. The aiming light is a visible beam of light that may either be fixed or follow light beam 151.

Figure 2:
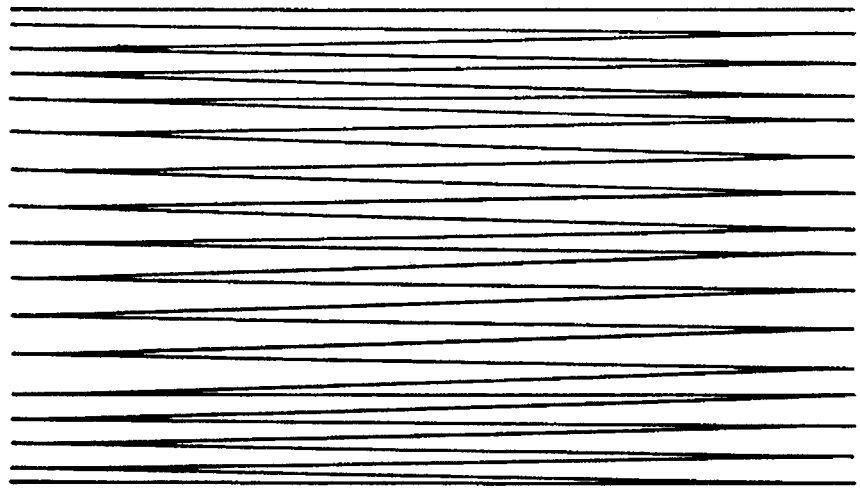
FIG. 2 is a diagram of a conventional raster scanning pattern.

Mirror 159 directs light beam 151 through a light-transmissive window 156 and across bar code symbol 170 in some predetermined pattern, such as a linear raster scan pattern. FIG. 2 is a diagram depicting the pattern of a known linear raster scanner. The two-dimensional scanning pattern can be generated by displacing in the vertical or y direction a one-dimensional or linear scan line driven in the horizontal or x direction. U.S. Pat. No. 4,387,297 explains a technique for forming the scanning pattern in FIG. 2.

Symbol 170 can be a one-dimensional bar code, such as the standard UPC/EAN code, or a two-dimensional bar code, such as PDF417 described in U.S. Pat. No. 5,159,639. In addition, as explained above, symbol 170 can be any other acceptable symbol carrying information to be decoded.

Light beam 152 is the light from beam 151 reflected off symbol 170. Beam. 152 returns to scanner 100 along a path parallel to, or at times coincident with, beam 151. Beam 152 thus reflects off mirror 159 and strikes partially-silvered mirror 147. Mirror 147 reflects some of beam 152 onto a light-responsive detector 158 that converts light 152 into electrical signals.

The electrical signals then pass into signal processing and control circuitry 165 to be processed and decoded to extract the information represented by the bar code. Signal processing and control circuitry 165 also controls the operation of motor 160 to adjust the scanning pattern and provide other control.

B. Adaptive Scanning

1. Identifying a bar code symbol

The scanner of this invention addresses two concerns. The first is to ensure that the target being scanned is a bar code. The second is to identify the type of bar code.

The purpose of ensuring that the scanned target is a bar code is obvious. The purpose of identifying the type of bar code is to adjust the scan pattern to improve detection.

To accomplish both purposes, a system according to the present invention samples light reflected from a portion of a target and analyzes those samples. The system first determines whether the target is a bar code symbol. If so, the system next determines whether the bar code symbol is one-dimensional or two-dimensional. If the symbol is one-dimensional, the system decodes the signals received from the scan. If the bar code is two-dimensional, the system ensures the scanning pattern is properly oriented and then begins to expand the scanning pattern to cover the entire code.

Figure 3:
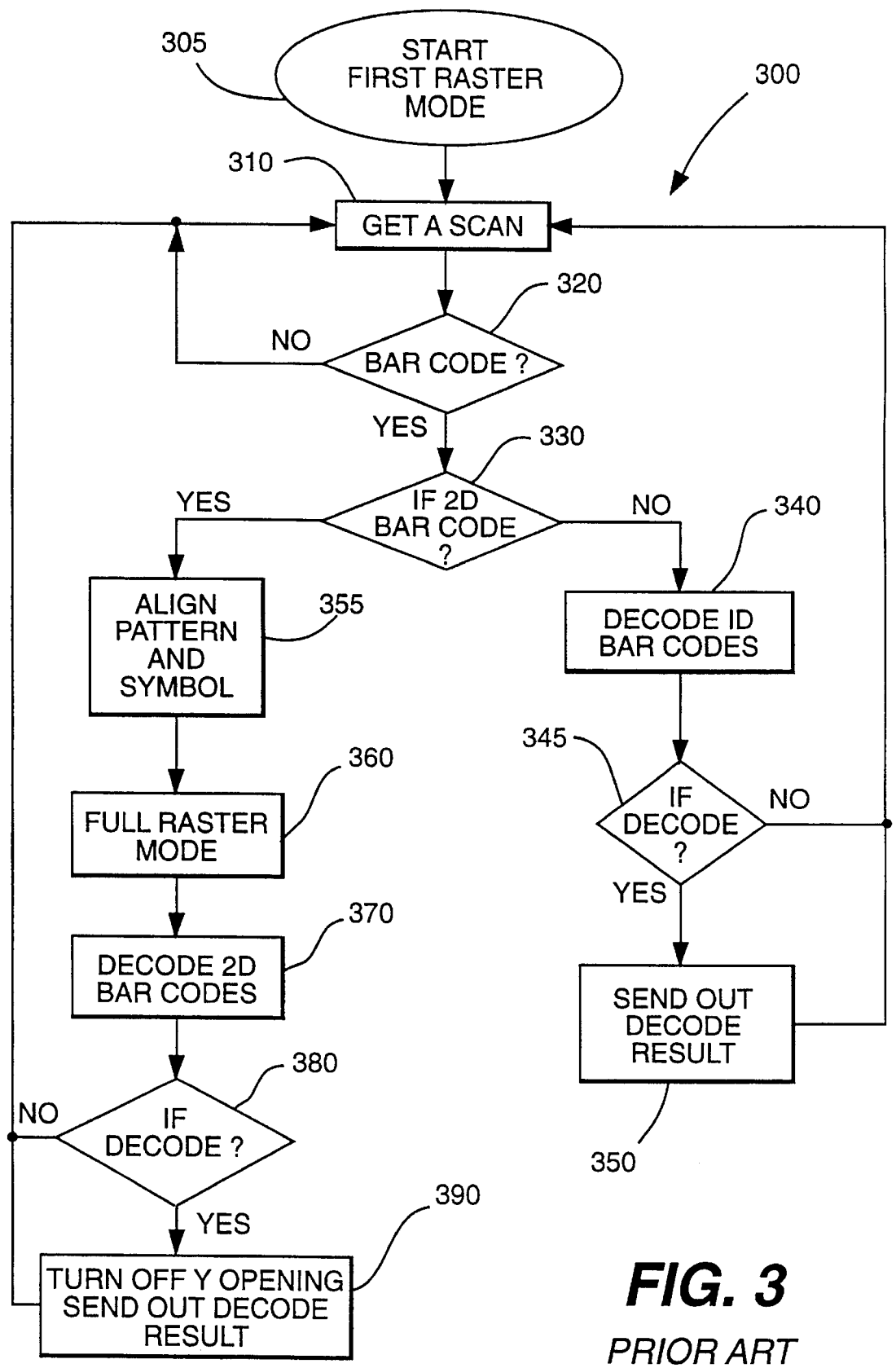
FIG. 3 is a flow chart of the preferred procedure for finding, identifying, and decoding bar codes according to this invention.

FIG. 3 is a flow chart 300 indicating the preferred procedure for finding, identifying, and decoding bar codes. First, scanner 100 generates a narrow (i.e., small vertical displacement) scanning pattern (Step 305), and then scanner 100 takes an initial scan. (Step 310)

In the preferred embodiment, the user presses trigger 154 to begin this scanning operation. Pressing the trigger causes scanner 100 to produce a narrow scanning pattern which is easy for a user to aim and direct toward a target.

Figures 4A, 4B:
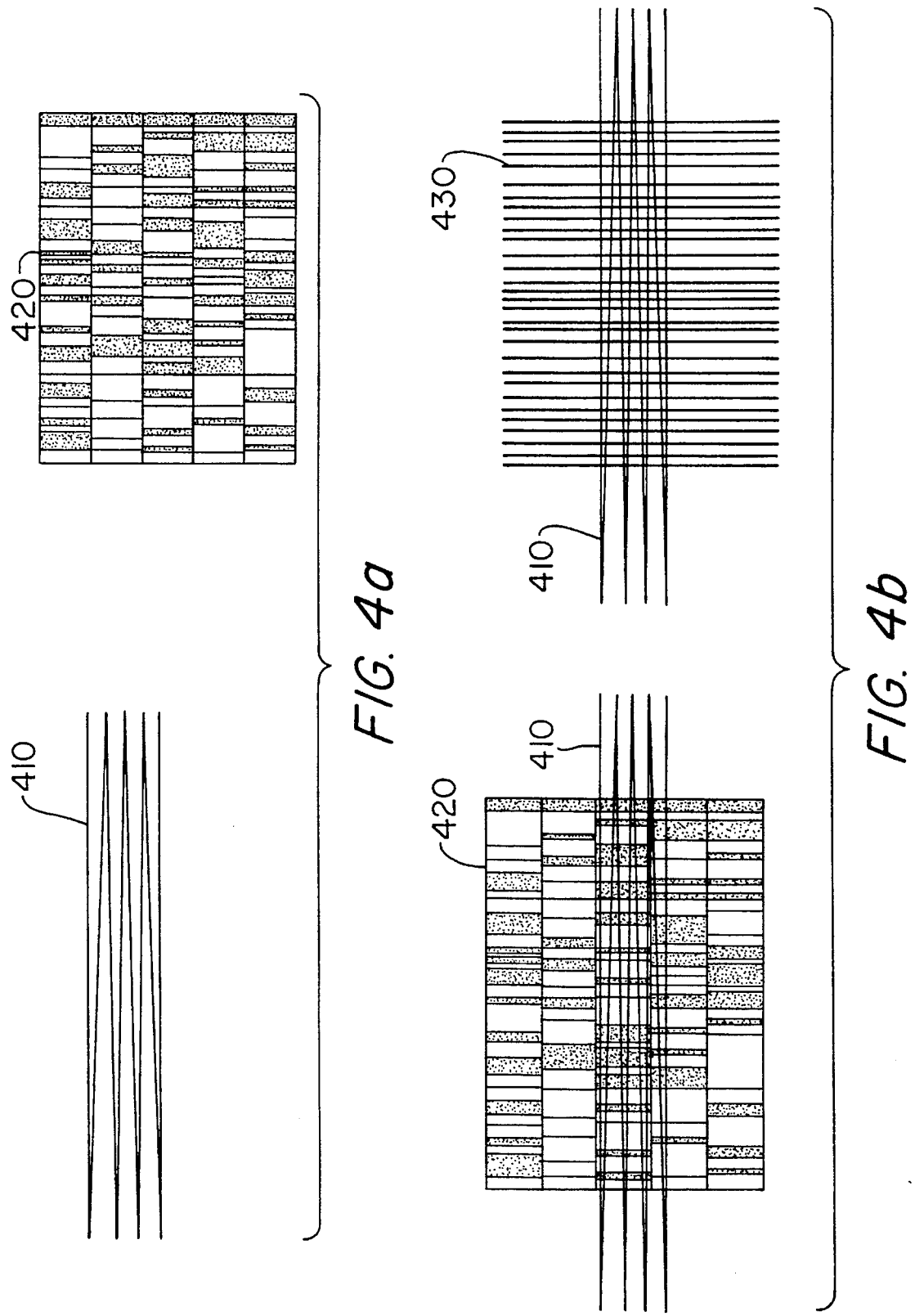
FIGS. 4a–4d are representations of raster scanning beams and bar codes.

FIGS. 4a–4d show a sequence of views of a target and a raster scanning pattern. FIG. 4a is a highly simplified schematic representation of the initial stage of operation when scanner 100 has generated the narrow scanning pattern 410, but the user has not yet properly placed pattern 410 at target, bar code symbol 420.

FIG. 4b shows the next stage of the operation, when user has properly placed the narrow scanning pattern 410 over two-dimensional bar code 420 (or one-dimensional bar code 430). Of course, FIG. 4b assumes the target is a bar code. The target could also be some other mark, in which case the system remains in the initial scan mode. (Step 310)

Once the scanning pattern is properly placed over the target, scanner 100 ensures that the scanned target is a bar code symbol. (Step 320) There are several conventional techniques for making this determination. These techniques are not the exclusive methods for distinguishing bar codes, nor are they mutually exclusive, One or more techniques may be used together.

One technique involves analyzing the spatial variation of the areas of different light reflectivity to determine whether the reflected light has characteristics expected from a bar code symbol. Signal processing and control circuitry 165 would typically be programmed to perform these analyses.

A second technique compares the length of the portions of low light reflectivity to those of high reflectivity. If the ratio of those lengths, is within a preset range, the system determines that it has found a bar code.

A third technique counts the number of transitions in a given time period between portions of different light reflectivity. That count can characterize the reflected light as some predetermined pattern, such as a generic bar code symbol, a class of bar code symbols, or even a specific bar code symbol.

A fourth technique compares the electrical signals generated from one scan with that from one or more subsequent scans. If the successive scans yield identical or nearly identical signals, the system concludes that it is viewing a bar code with bars and spaces of uniform widths. A variation of this technique compares several scans to determine whether successive scans differ, but have similar groupings. If so, the target is likely a two-dimensional bar code.

A fifth technique is to try to decode the scans. If the decode is not successful, the system concludes that the target is not a recognizable bar code.

If the target is not a bar code symbol, the system remains in the initial scan mode. (Step 310) At that point, the user may move scanner 100 closer to or farther from the target to account for the possibility that the target lay outside the working range of scanner 100. The user can also seek a new target.

If the target is a bar code symbol (Step 320), scanner 100 tries to determine whether the bar code is one-dimensional or two-dimensional. (Step 330) There are several ways to make this determination as well. One way is to try to decode a row and make the determination on the basis of the decoded information. Another way is to use an intelligent sensing algorithm, such as attempting a decode, to determine whether the sensed portion is from a one-dimensional or a two-dimensional bar code.

In addition, although flow chart 300 shows that the determination of whether a target is a bar code is separate from the determination of the bar code's type, the operations need not be separate. For example, both determinations may take place during the same operation.

After determining the type of bar code, the scanner follows different paths for decoding the bar code. If the symbol is in a one-dimensional bar code, the scanning is virtually complete. Scanner 100 attempts to decode the code without altering the height or width of the scanning pattern. (Step 340) If scanner 100 is successful (Step 345), it sends the decoded data out for further processing. (Step 350) If not, scanner 100 takes additional scans (Step 310) until it successfully decodes the symbol. (Step 345) Scanner 2100 may also be programmed to stop after too many unsuccessful decodes or after too much time has passed.

If the symbol is in a two-dimensional bar code (Step 330), additional scanning must take place. First, scanner 100 must make sure the scanning pattern is properly aligned with the bar code. (Step 355).

Figure 5:
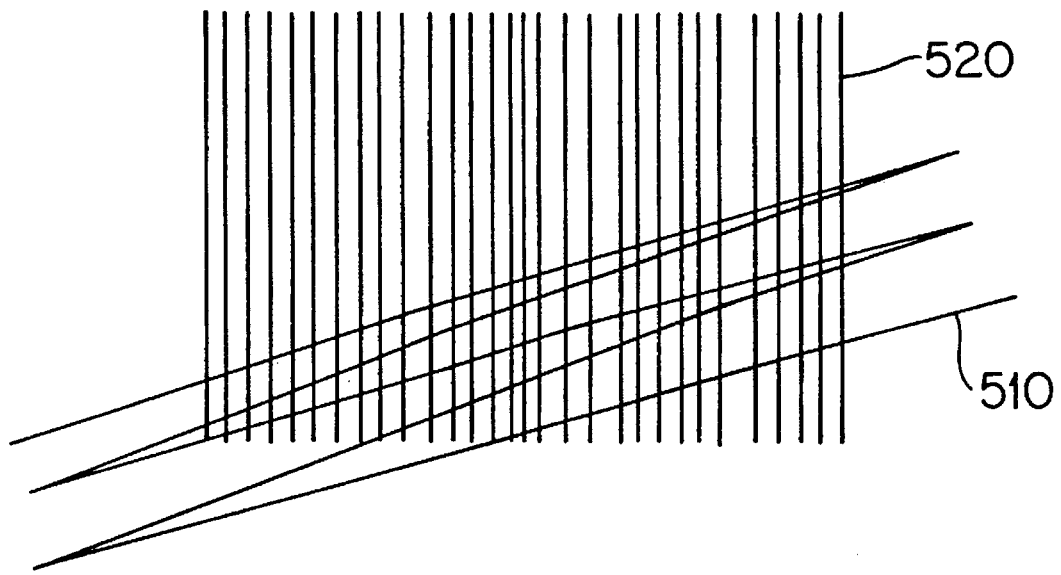
FIG. 5 shows a raster scanning pattern traversing a one-dimensional bar code that is skewed with respect to the scanning pattern.

Orientation is not a problem for one-dimensional bar codes. FIG. 5 depicts the raster scanning pattern 510 traversing a one-dimensional bar code 520 skewed with respect to the direction of the scan lines. The scan lines of a pattern do not need to be orthogonal to a one-dimensional bar code's vertical bars because one or more of the scan lines still traverse the same sequence of bars and spaces.

The situation for two-dimensional bar codes is more difficult. FIGS. 6a, 6b, 6c and 6d are pictorial representations of the raster scanning pattern traversing a two-dimensional bar code 600 originally skewed with respect to the scanning pattern.

Figure 6B:
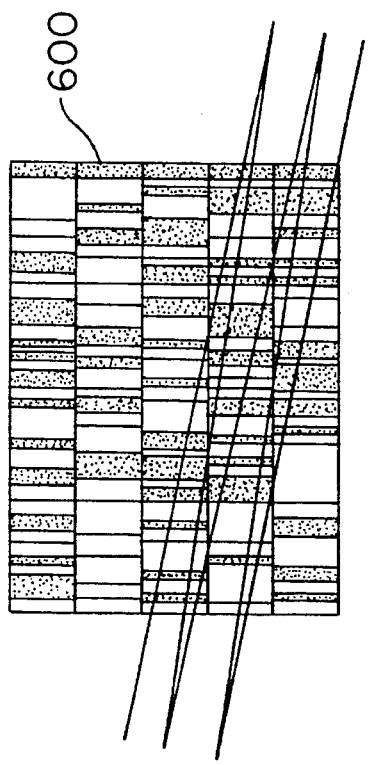
FIGS. 6a–6d are representations of a raster scanning pattern traversing a two-dimensional bar code that is initially skewed with respect to the scanning pattern.
Figure 6D:
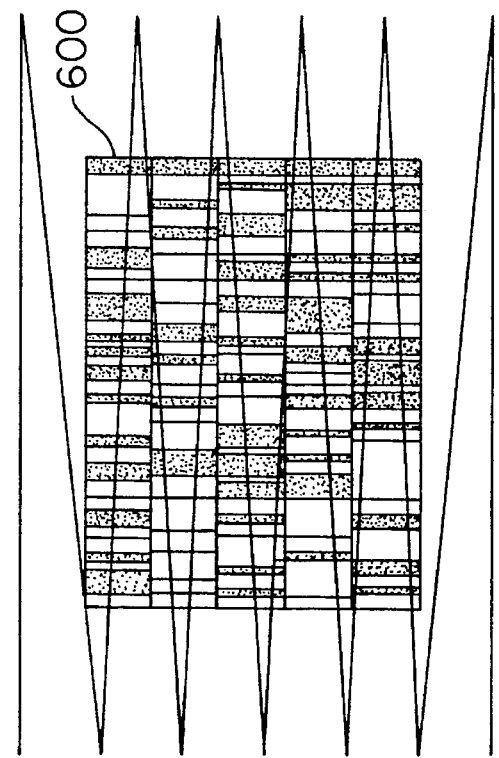
Figure 6A:
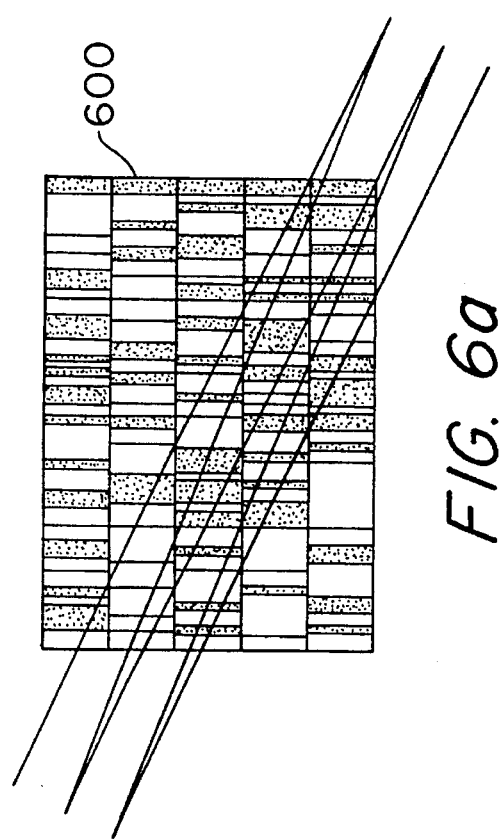

FIG. 6a contains a highly simplified schematic representation of the initial raster scanning pattern skewed or misaligned with respect to two-dimensional bar code 600. Scanner 100 preferably determines this condition by noting when a scan line crosses a row. For example, the PDF417 code uses different codes in different rows (actually there are three different codes that repeat). When the code changes during the decode of a scan line, scanner 100 detects that the scan lines are not aligned.

To read the skewed two-dimensional bar codes, scanner 100 can use several different techniques, such as those describe in copending U.S. patent application Ser. No. 317,433, which is herein incorporated by reference. Once scanner 100 determines that the scanning pattern is misaligned, it can begin to reorient, as shown in FIG. 6b.

Figure 6C:
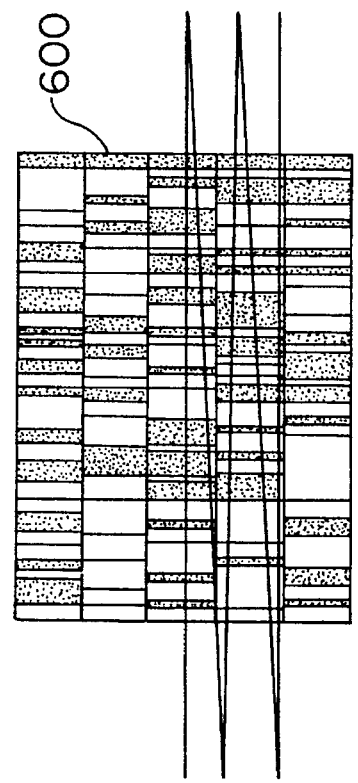

If further analysis reveals that symbol 600 is still skewed relative to the scanning pattern, the system can continue to reorient the scanning pattern until it finally aligns with symbol 600, as shown in FIG. 6c. When reorientation is complete, the entire bar code can be read by using a fully aligned and height-adjusted scanning pattern, as shown in FIG. 6d.

After aligning the scanning pattern with the bar code symbol, scanner 100 enters the full raster mode to increase the height of the scanning pattern. (Step 360) This is done to decode the entire symbol. The term "full raster mode" signifies the process of controlling mirror 159 and motor 160 to change the height, and even width, of the raster scanning pattern. During full raster mode, the pattern height and width usually increase in stages, as FIGS. 4c and 4d demonstrate.

Figure 4C:
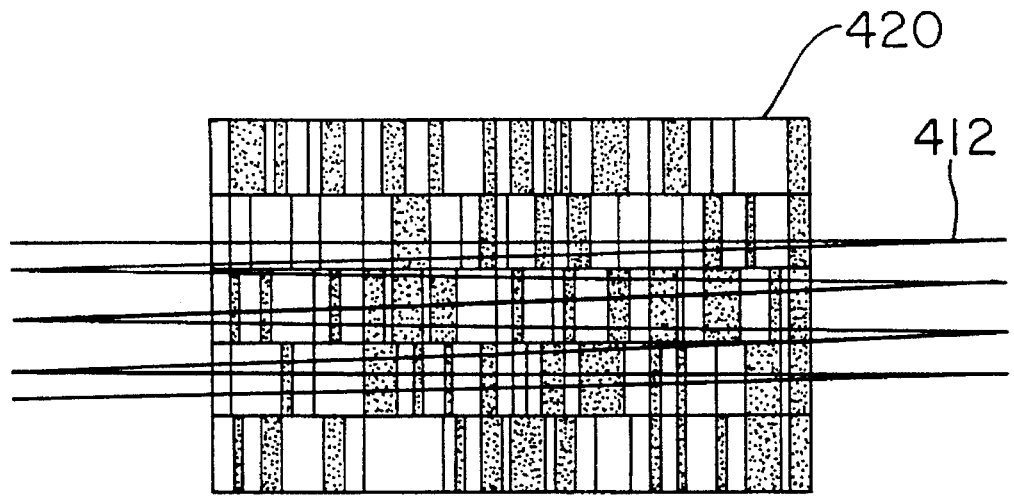

FIG. 4c is a highly simplified schematic representation of a intermediate stage in the operation of scanner 100 during the full raster mode. As the height of the scanning pattern 412 increases, scanner 100 reads the bar code rows covered by the pattern to decode the pattern and to determine when to stop increasing the pattern height. This continues until the entire symbol is read.

Figure 4D:
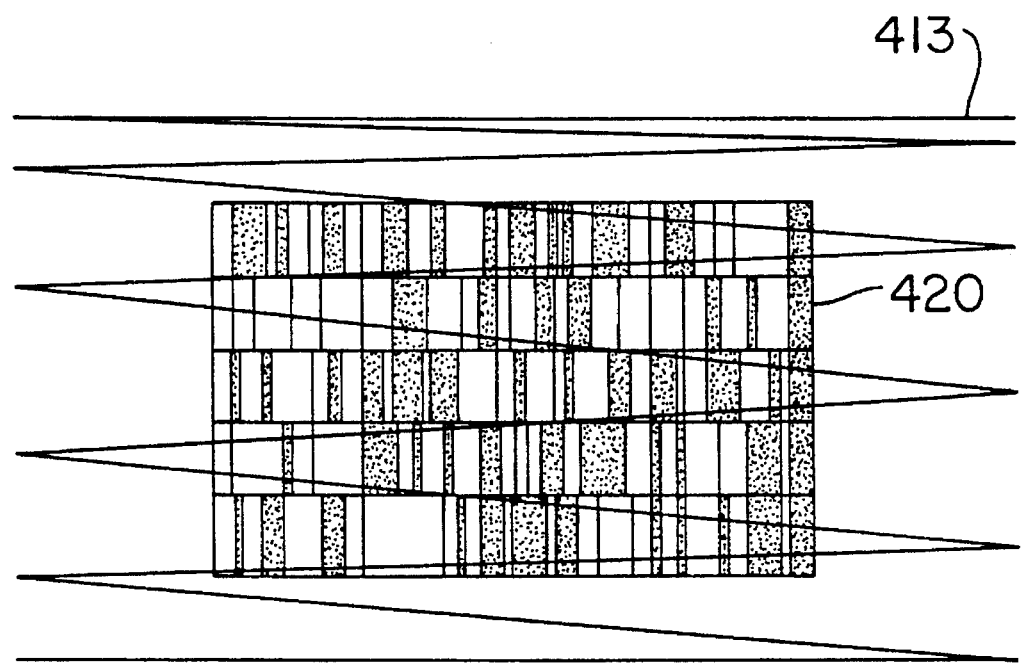

FIG. 4d is a highly simplified schematic representation of the final stage of operation. At this point, scanning pattern 413 covers the entire bar code 420 as well as areas outside of the code 420.

When scanning in the full raster mode, the pattern height increases but the number of scan lines that sweep the bar code symbol does not change. Instead, the height and width of the scan pattern increase, and the angles between adjoining scan lines also increase as FIGS. 4b–4d show. The most effective alignment of the laser scan pattern occurs when each scan line crosses exactly one row in the two-dimensional symbol.

Once the size of the pattern is set (and, preferably, as the size is increasing), scanner 100 decodes the two-dimensional symbol. (Step 370) If scanner 100 successfully decodes the symbol (Step 380), it transmits the decoded data and either narrows the scanning beam or turns it off. (Step 390) If scanner 100 does not successfully decode the symbol (Step 380), scanner 100 continues scanning until it achieves a successful decode or until a predetermined amount of time has elapsed. The predetermined amount of time is typically on the order of three seconds, which is regarded as sufficient time for an operator to sight a symbol and obtain a successful decode.

2. Scanning height adjustment

One drawback to the operation just described is that in full raster mode, the pattern will sometimes cover more than just the target bar code. For example, FIGS. 4d and 6d show several scan lines extending beyond the top and bottom edges of the two-dimensional symbol. This unnecessary scanning slows the entire scanning procedure. To solve this problem, the present invention minimizes the amount a given pattern extends beyond a symbol and decreases the scan time by limiting the area of a bar code symbol and surrounding area covered by the scan pattern.

There are at least two techniques to accomplish this goal. The first technique works for codes such as the PDF417 code that embed information about the size of the symbol in the rows of the code. The second technique works for other types of codes.

a. PDF417mode

For codes such as the PDF417 code, information acquired from the initial scan pattern allows the system to determine the number of rows of the symbol above and below the initial scan pattern in the second stage. This allows the system to find an appropriate new scan pattern and control the rate of opening the scan angle to reach the new pattern, and send the proper control signals to the scanner.

Figure 7:
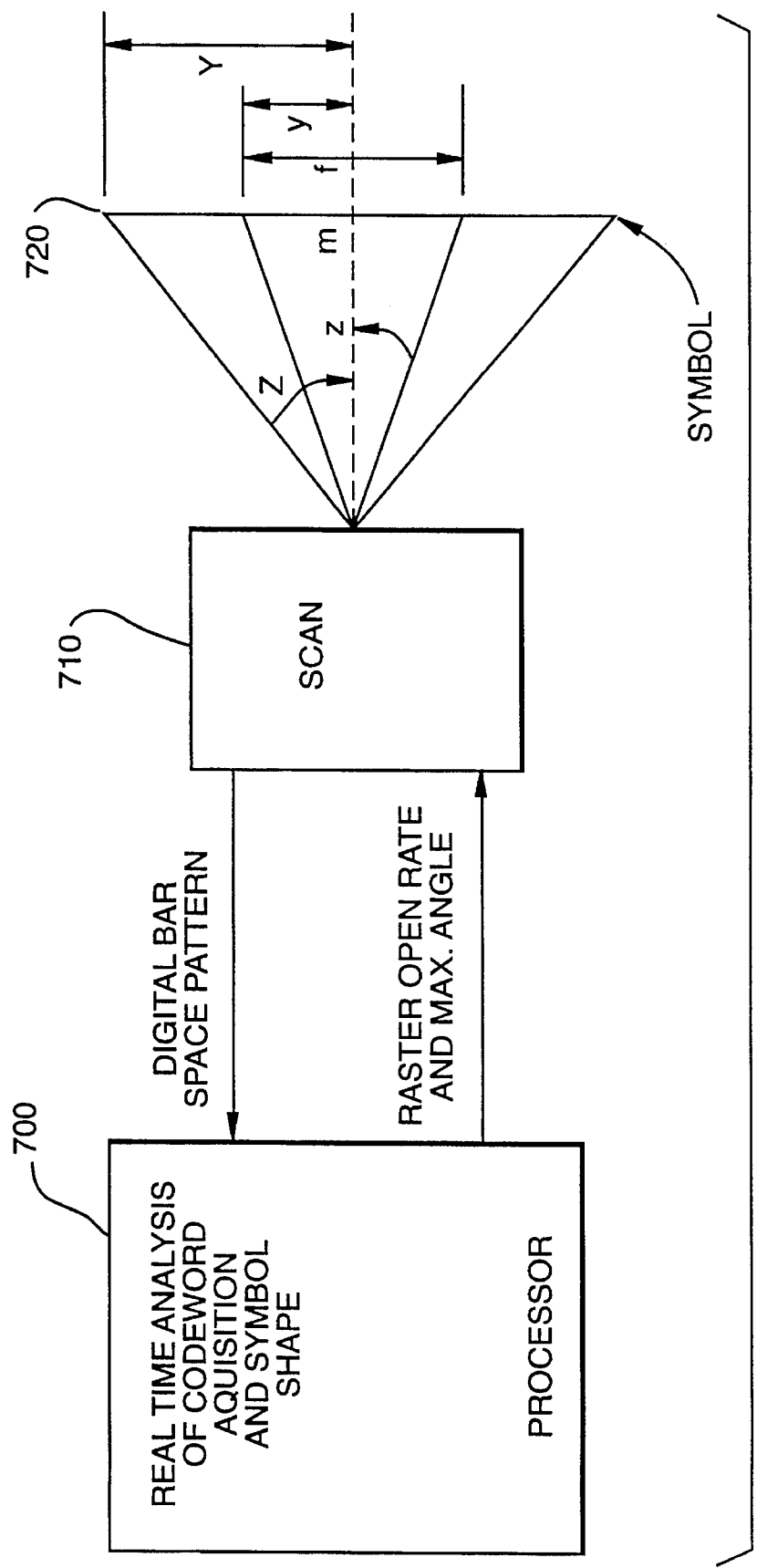
FIG. 7 is a high level diagram showing raster pattern control according to this invention.
Figure 12:
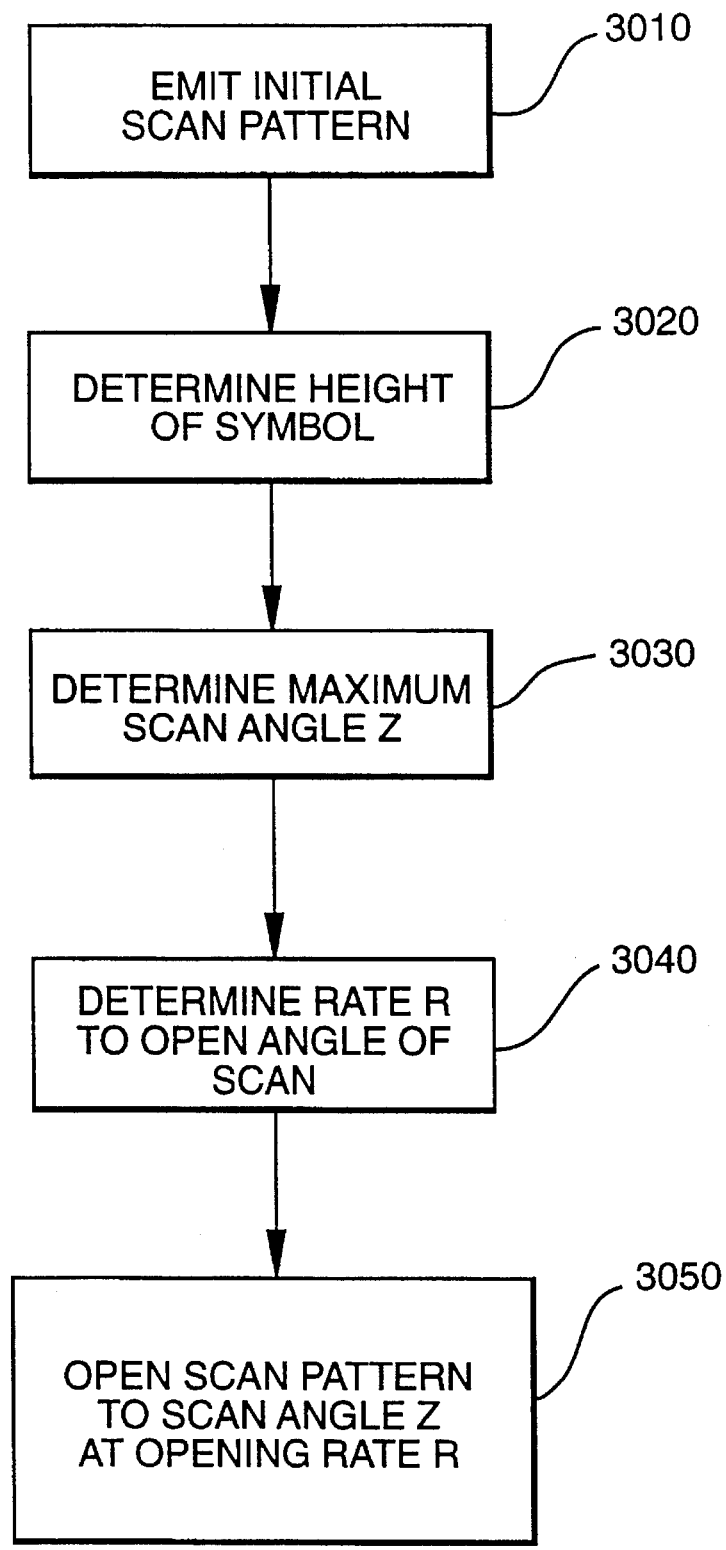
FIG. 12 shows a flow chart for raster pattern control for a 2-D stacked bar code.

FIG. 7 is a high level diagram showing raster pattern control according to this invention. FIG. 12 is a flow chart for raster pattern control of a 2-D stacked bar code, for example, a PDF417 code. A raster pattern control processor 700, which can be part of control circuitry 165, controls a scan engine 710, which can also be part of circuitry 165, to read symbol 720, shown by a side view. Scan engine 710, located a distance d (not shown) from symbol 720, emits an initial raster scan pattern open to a vertical angle z, as shown in step 3010 of FIG. 12.

When the faster control processor decodes the result of the scan at angle z it determines that the initial scan pattern crosses f rows of the two-dimensional symbol. If the scan pattern is centered, the number of rows crossed above the middle row m of the pattern is y, which equals f/2.

Next, information regarding the height of symbol 720 is determined, as shown in step 3020 of FIG. 12. The raster control processor 700 decodes information acquired from the initial scan of symbol 720 to determine one-half of the maximum number of rows, Y, of the entire symbol 720. If the bar code is encoded in the PDF417 format, the first two columns in each row contain information about the height of the entire symbol.

From this information, processor 700 can determine the scan angle Z required to read the entire symbol 720 without reading areas above or below symbol 720 as shown in step 3030 of FIG. 12. This can be done as follows:

$d=y/(\tan (z))$;

$Z=\tan^{-1} (Y/d)$, or $\tan^{-1} ((Y/y)*\tan(z))$.

From this value of Z, processor 700 determines the rate R to open the angle of scan to the angle Z as shown in step 3040. The rate R is important because processor 700 is preferably decoding symbol 720 as the pattern expands, and the rate of expansion must accommodate this operation. For example, if symbol 720 is large, the rate should be low. If symbol 720 is small, the rate should be fast. Another reason for controlling the rate of the y-direction expansion is that the scanner decodes as it expands.

As the scanning pattern expands in the full raster mode, the scanned data is most useful at the top and bottom of the pattern because the scanner has already read the center areas of the bar code.

To determine the rate R of y-direction expansion, processor 700 first finds the angle differential a as $$a=Z-z.$$

Then, raster control processor 700 determines the rate R as follows:

$$R=a/(r*Y),$$

where r is the time scan engine requires to read a single row.

Control processor 700 then sends commands to scan engine 710 to direct it to open to a maximum scan angle Z at a rate R, as shown in step 3050 of FIG. 12. A preferred implementation of this communication is explained below in the section entitled "Scan engine interface."

In response to the commands, scan engine 710 opens the scan pattern to angle Z to include all of the rows of the symbol 720 without including areas above and below the symbol. This saves scanning time.

Figure 8:
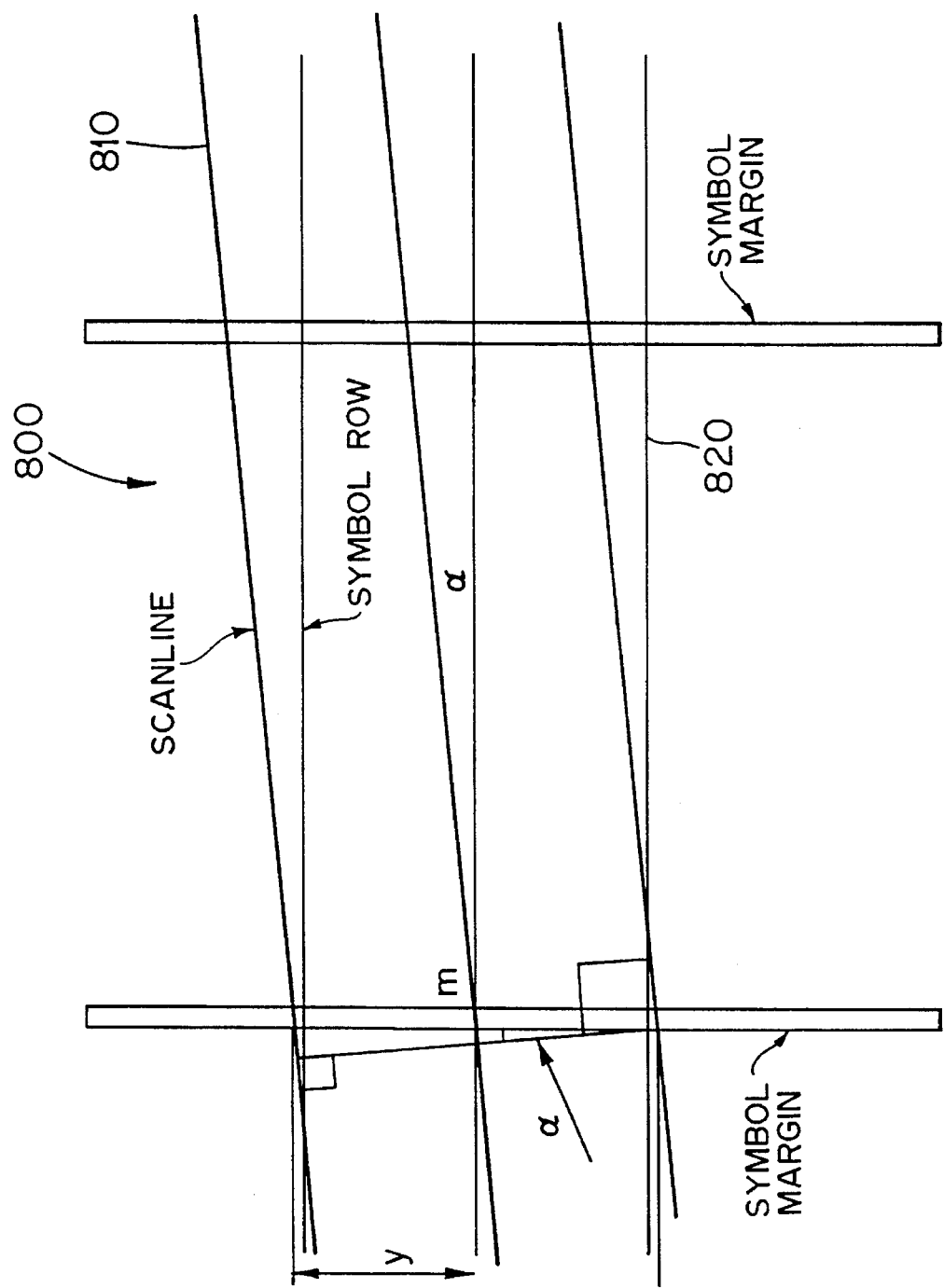
FIG. 8 is a front view of an outline of a symbol that is skewed with respect to the scanning pattern.

This procedure for accelerating scanning applies even when the initial scan pattern is skewed relative to the symbol, which is typical. FIG. 8 shows a front view of the outline of a symbol 800 with portions omitted for clarity. In FIG. 8, the initial scan lines 810 are skewed from rows 820 of symbol 800 by an angle $\propto$.

The formula for determining the maximum scan angle Z and the opening rate R when there is no skew angle also works when there is a skew angle because the effect of the skew angle cancels out. Although a nonzero skew angle will increase y, the number of rows initially scanned above the middle row m, by a factor of cos $\propto$, the maximum number of rows Y decreases by the same factor. These two effects cancel out.

The procedure described with regard to FIG. 7 assumes that the user has positioned the scan line approximately at the vertical midpoint of the bar code. If the user does not accurately position the scan line at the midpoint, processor 700 will know this from information in the PDF417 code. The code in each row contains information about the row's number, which processor 700 can use to make corrections as appropriate.

b. Alternative mode

Figure 9:
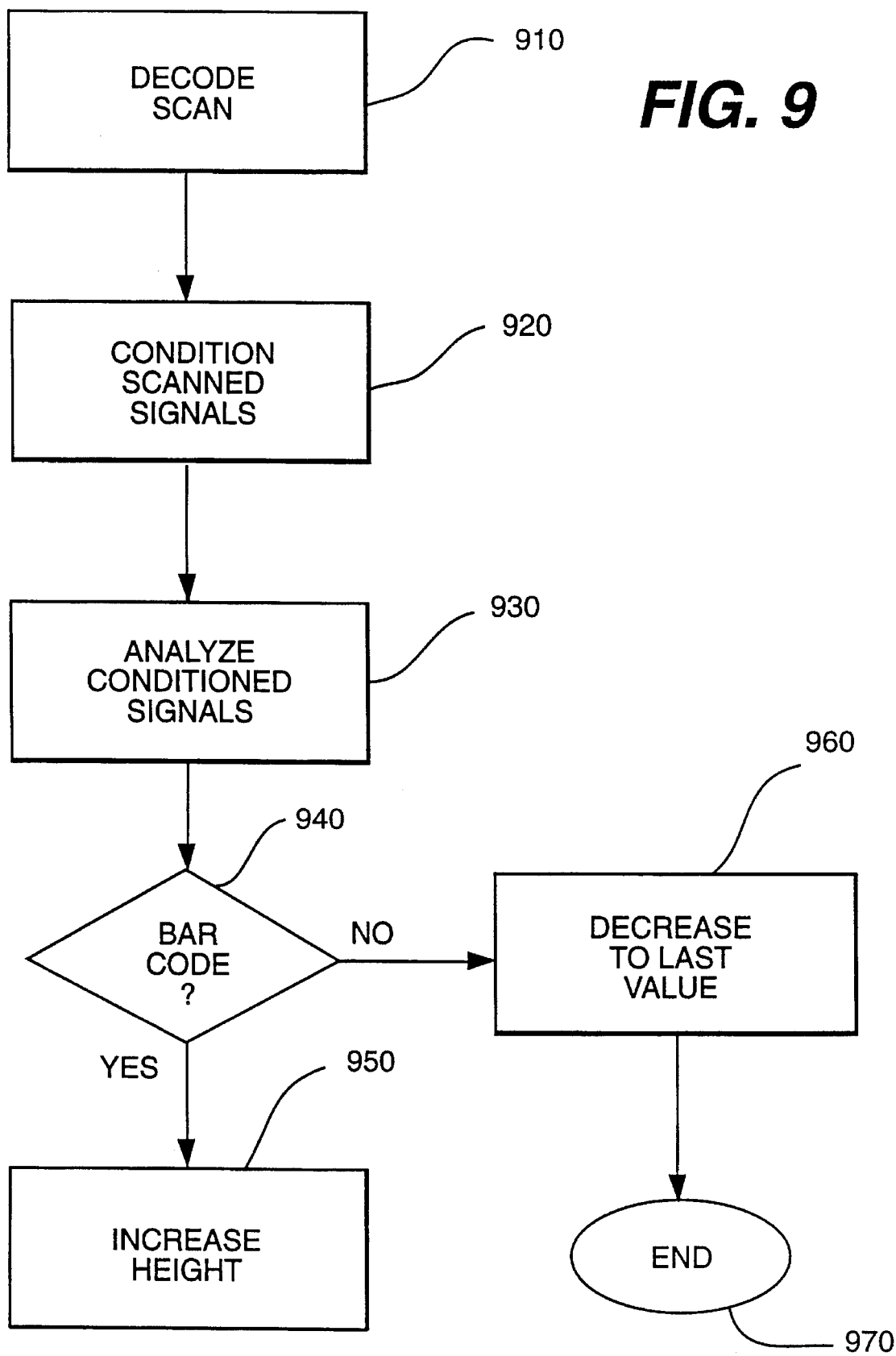
FIG. 9 is a flow chart of a procedure for implementing a full raster scan of a two-dimensional symbol.
Figure 10:
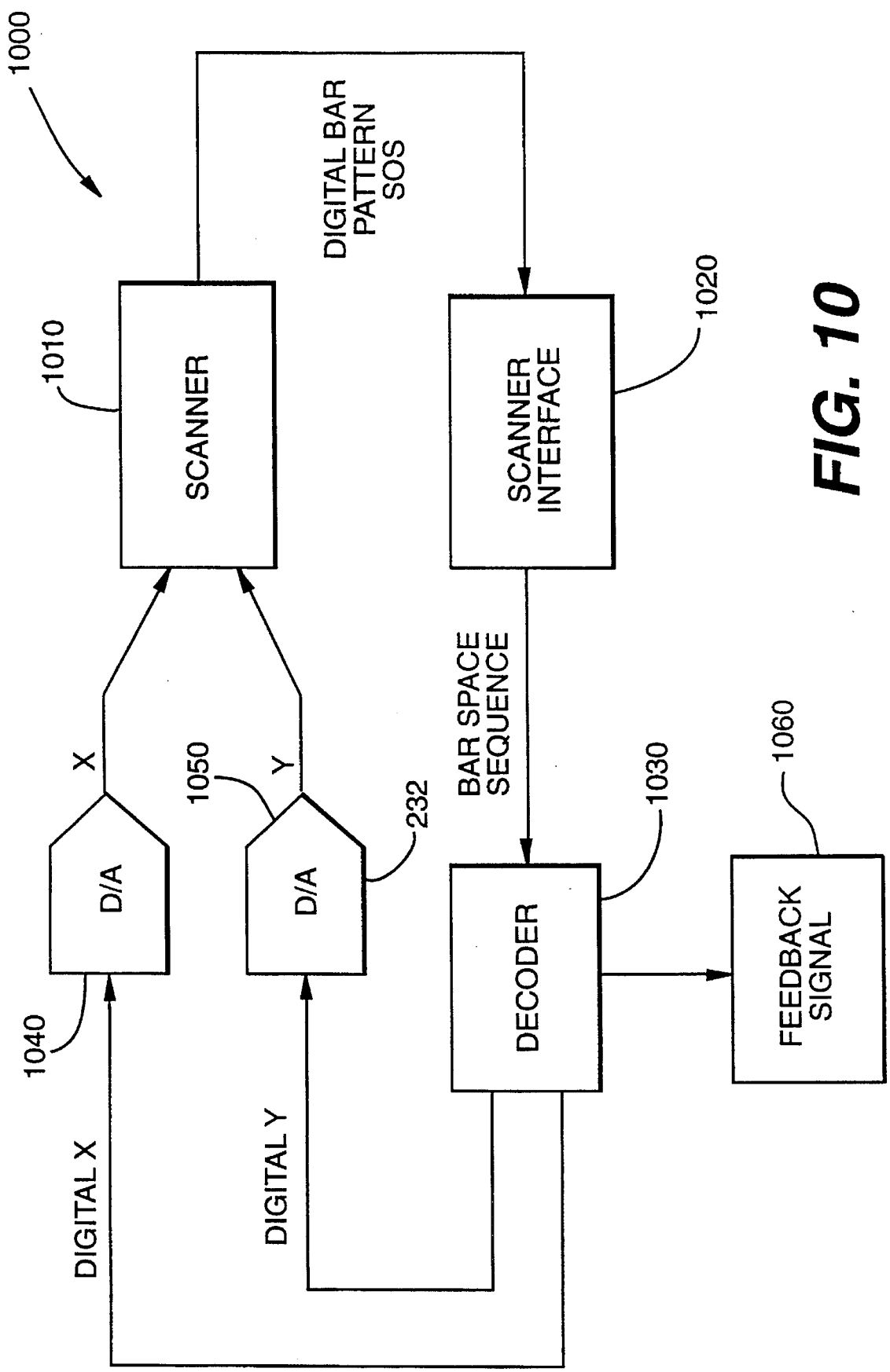
FIG. 10 is a block diagram of a scanning system showing the control of a scanner in a full raster mode.

If the two-dimensional bar code symbol does not have embedded information to allow the procedure described in relationship to FIGS. 7 and 8, the present invention contemplates a different procedure shown in FIG. 9 and using the scanning system 1000 shown in FIG. 10. FIG. 10 depicts the control of scanner 1010 in the full raster mode.

Flow chart 900 in FIG. 9 begins by decoding a scan. (Step 910) This is done by having scanner 1010 begin a raster pattern across a bar code symbol and receive the reflected light from the symbol. From that reflected light, scanner 1010 generates electrical signals representing the widths of the bar and space pattern.

Actually, scanner 1010 sends two types of signals: the Start of Scan (SOS) and Digital Bar/space Pattern (DBP). The SOS signal is a square waveform which changes levels at the start of each scan, so it is a logical 0 for scans in one direction and a logical 1 for scans in the other direction. The DBP signal is a digital waveform consisting of logical 1 and logical 0 pulses whose durations represent the widths of the bar and space pattern of the bar code being scanned.

Next, the scanned signals are conditioned. (Step 920) FIG. 10 actually shows this step as occurring in two smaller steps. First, scanner interface 1020 measures the durations of each pulse by counting the number of pulses of a timer that occur during each bar and space.

Scanner interface 1020 then records those values (DBP counts) for each bar or space, and uses the SOS signal to group the DBP counts for each scan. Scanner interface 1020 sends these grouped counts to decoder/scan control 1030 as a Bar Space Sequence.

Next, the conditioned signals are analyzed to determine whether they represent bar code information or some other type of information. (Step 930) In the embodiment shown in FIG. 10, decoder/scan control 1030 makes this determination by looking at the DBP counts. For example, a large DBP count indicates a white or black space that is too large to be a bar or space in a bar code symbol. Alternatively, decoder/scan control 1030 may sense that the number of elements in one scan symbol differs greatly from the number of elements determined from scans taken inside the symbol. Other techniques are possible as well. For example, the inability of the decoder/scan control to recognize any characters might indicate that the current scan did not cross the bar code.

If the conditioned signals represent a bar code pattern (Step 940), then the scanning pattern increases (Step 950), and the process repeats. If not, the pattern is reduced to its previous value (Step 960) and raster mode is finished. (Step 970)

In FIG. 10, decoder/scan control 1030 determines whether scanner 1010 must enlarge or reduce the raster pattern. To change the size of the raster pattern, decoder/scan control 1030 sends digital control signals to digital-to-analog converters 1040 and 1050 to provide the X and Y driving signals, respectively, for scanner 1010.

Instead of simply causing the D/A converters 1040 and 1050 to change voltages, system 1000 can use more sophisticated control techniques to provide for better control over the behavior of the scanner raster pattern. Some of these are described below in the section entitled "Scanning Control."

There is a note of caution, however. Any technique to control the raster pattern should have parameters that can be tied to the mechanical properties of the scanner. These parameters allow for a smoother change in the size of the raster pattern, and the proper rate of change enables the scanner 1010 to respond smoothly to the voltage changes received from the decoder/scan control 1030. The proper rate and smoothness of change can eliminate the flicker that annoys some users.

The length of the scan and the rate at which it is adjusted depend on the amount of white space in the scan data before and after useful bar code data is decoded. Decoder/scan control 1030 can determine how much the raster has exceeded the edge of the bar code symbol in the y-direction by counting the number of scans from which no data can be decoded. For example, a large white space can be detected by observing a large DBP count. The scanner 1010 then makes adjustments, as described above, based on the data values received.

Although the size of scanning patterns can adapt to changes in the distance between the scanner and the bar codes, the change in size should not take place too quickly. The rate of y-direction expansion should depend on the number of rows in a label and the label's height.

To teach the scanner operator the correct range and orientation of the scanner in order to read symbols quickly and accurately, a feedback signal 1060 (an audible "beep" or a visual indicator) may be used when a symbol is detected in range. FIG. 10 shows this signal 1060 as connected to decoder/can control 1030. In one embodiment, an LED blinks slowly when there is poor alignment and accelerates proportionately as the alignment improves.

3. Bar code detection and identification circuitry

Figure 11:
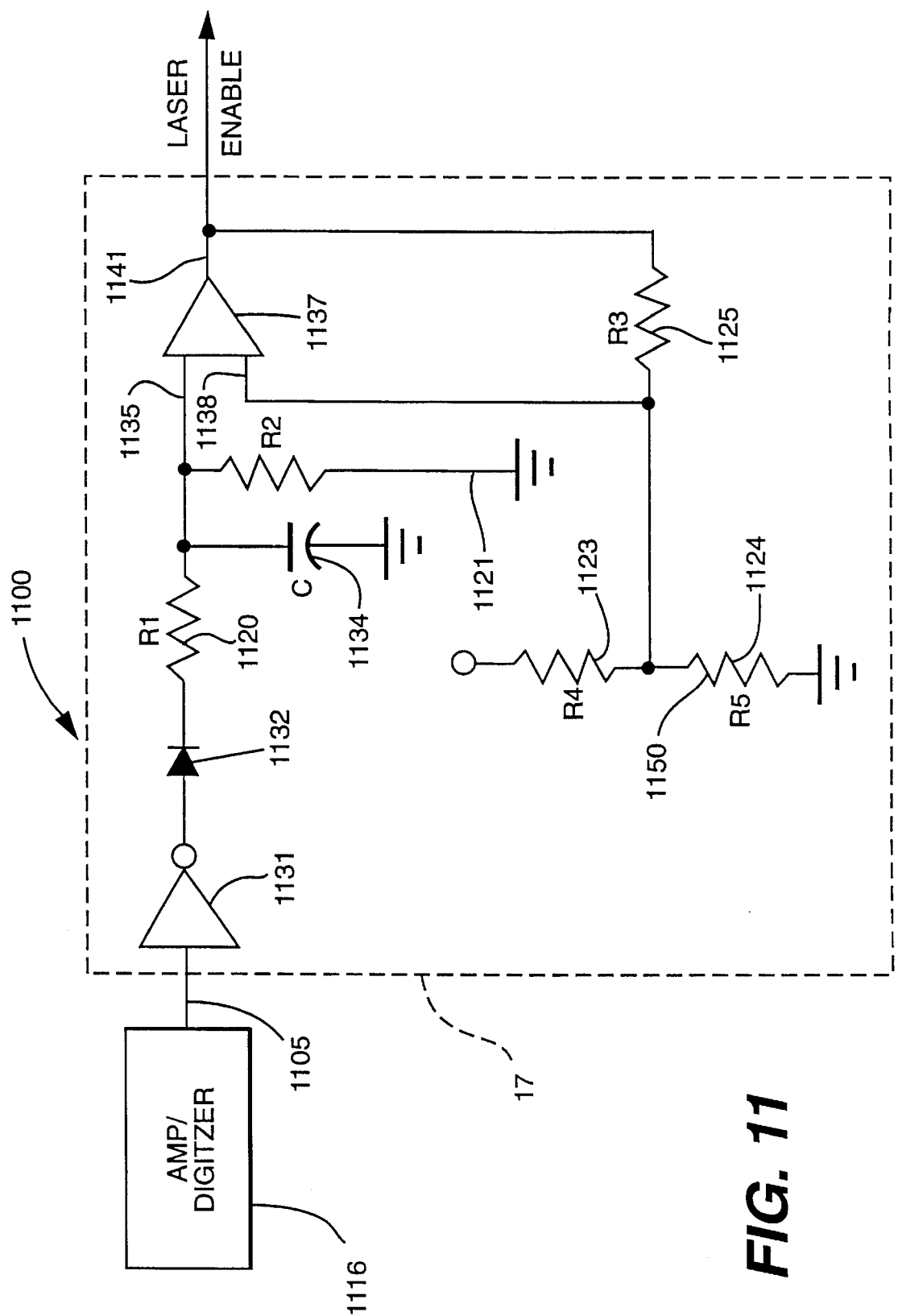
FIG. 11 is a diagram of a circuit to determine whether a scanned target is a bar code.

One of the key steps in flow chart 300 shown in FIG. 3 is to determine whether the scanned target was a bar code. Although there are several ways to make this determination, FIG. 11 shows a diagram of a circuit 1100 to do so. This circuit is also disclosed in parent application Ser. No. 506,674.

Circuit 1100 receives a signal 1105 from amplifier/digitizer 1116, and that signal enters the input of an inverter 1131. The output of inverter 1131 connects to the anode of a diode 1132, and the cathode of diode 1132 connects to an RC circuit formed by resistor 1120 connected in series with a parallel circuit of resistor 1121 and capacitor 1134. Diode 1132 prevents capacitor 1134 from discharging into the output of inverter 1131.

Resistor 1121 and capacitor 1134 also connect between a ground potential and one input 1135 of an open collector output comparator 1137. The second input 1138 of comparator 1137 is a threshold level. That threshold level is also the potential of an intermediate node of a voltage divider formed by the series connection of resistors 1123 and 1124 between supply voltage V and ground.

The output of comparator 1137 is a "laser enable" signal 1141 that indicates the target is a bar code. Comparator 1137's output also feeds back to the voltage divider's intermediate node 1150, and thus to input 1138, via resistor 1125, which has a value R3. This feedback provides a hysteresis effect to the comparison operation.

As FIG. 11 shows, resistor 1120 has a value R1, resistor 1121 has a value R2, resistor 1123 has a value R4, resistor 1124 has a value R5, and capacitor 1134 has a value C. R2 is much larger than R1.

Circuit 1100 actually examines the lengths of different portions of signal 1105. When that signal is low, indicating the presence of a bar, the output of inverter 1131 is high, and charges capacitor 1134 with a time constant of approximately R1*C, since R2 is so much larger than R1.

For a space, signal 1105 is high and thus the output of amplifier 1131 is low. This discharges capacitor 1134 through resistor 1121 since the diode 1132 prevents discharging through resistor 1120. The time constant R2*C is much greater than the time constant R1*C, so the circuit requires a longer space to cancel the effect of a bar.

After the circuit 1100 examines several bars and spaces from a bar code having a typical density, capacitor 1134 develops a voltage that exceeds the threshold level of comparator 1137. This activates laser enable signal 1141.

This activation also drives the open collector output of comparator 1137 low, dropping the threshold voltage at input 1138. This behavior causes hysteresis to prevent minor voltage changes on capacitor 1134 by bars, spaces, and quiet zones from disabling laser enable signal 1141.

It might appear as if circuit 1100 would also trigger if amplifier/digitizer 1116 produced a detected signal representing a long black bar. This is not a problem, however, because in the preferred embodiment, amplifier/digitizer 1116 functions as a high pass filter to prevent generating long signals. For example, amplifier/digitizer circuit 1116 could produce only short pulses of known durations for black bars, so the signal for a long black bar would be the same as a shorter one.

Circuit 1100 is sufficiently flexible to be used, along with software executed by CPU 140 (FIG. 1) for other purposes. For example, circuit 1100 can help discriminate a bar code from text or other graphics. To do so, circuit 1100 and CPU 140 exploit the uniform width of bar codes as compared to text which has differing widths. Because of this characteristic, different scans through different slices of a bar code pattern will likely yield similar results. On the other hand, different scans through different portions of text will yield different results. Scan lines spaced sufficiently close together may even be used to distinguish two-dimensional bar codes from graphics because of the uniform width of the bars and spaces in two-dimensional bar codes.

A raster scan pattern works well with this technique by automatically moving the scans perpendicularly. This guarantees that successive scan lines cross parallel slices of the scanned pattern.

Furthermore, greater accuracy may be obtained by controlling certain operational parameters, such as horizontal and vertical scan angles, in response to the type of bar code determined to be scanned. This is useful for a single system to decode both one-dimensional and two-dimensional bar codes.

Scanning according to this invention is not limited to raster-type scanning. Individual control of X-axis and Y-axis allows the system to provide a scan pattern of any desired shape. For example, using only the X-axis controls generates a linear scan line at the symbol. Driving the X-axis and Y-axis controls at uniform rates of speed causes a raster-type scan pattern having a set of generally parallel scan lines. Driving the X-axis and Y-axis scans at sinusoidally varying rates generates an omnidirectional Lissajous-type scan pattern.

Information on scanning control may be found in U.S. Pat. No. 4,387,297, as well as U.S. patent application Ser. No. 520,464, filed May 8, 1990, which is also incorporated herein by reference.

One last advantage of using the circuitry in FIG. 11 arises from the signal processing it performs without using other scanner resources. This technique reduces the amount of processing CPU 140 must perform, and thus reduces the system's latency when reading a bar code symbol.

What is claimed is:

1. A bar code reader for reading a bar code symbol having a defined boundary with top and bottom edges comprising:

a light beam scanner for directing a light beam toward a target in a predetermined pattern;

a detector for receiving portions of the light beam reflected from the target and generating electrical signals representing the received, reflected light beam;

identifier means for determining whether the target is a bar code symbol; and feedback means, responsive to the electric signals, for controlling the scanner to conform the shape of the predetermined pattern to the top and bottom edges of the boundary of the target if it is a bar code symbol.

2. The bar code reader of claim 1, wherein the feedback means includes means for controlling the scanner to open to a maximum scan angle at an opening rate.

3. The bar code reader of claim 2, wherein the feedback means includes means for determining the maximum scan angle based on the height of the symbol, the initial scan angle of the predetermined pattern, and the number of rows initially scanned by the predetermined pattern.

4. The bar code reader of claim 3, wherein the feedback means includes means for determining the height of the symbol from information contained in the rows of the symbol initially scanned by the predetermined pattern.

5. The bar code reader of claim 2, wherein the means for controlling the scanner determines the opening rate based on the maximum scan angle.

6. A method for reading a bar code symbol comprising:

directing a raster scan pattern towards a target;

receiving reflected light from the target;

generating electrical signals representing the widths of bars and spaces of a bar and space pattern of the target based on the reflected light;

determining whether the target is a bar code symbol; and increasing the height of the raster scan pattern to conform to the shape of the target if the target is a bar code symbol.

7. The method of claim 6 further comprising the step of counting and recording durations of pulses of a timer occurring during each bar and space of the bar and space pattern.

8. The method of claim 7, wherein the determining step includes the substep of analyzing the duration of the pulses.

9. The method of claim 6, wherein the step of increasing the pattern height includes the substep of controlling the rate of y-direction expansion according to the number of rows in the symbol and the height of the symbol.

10. The method of claim 6, wherein the step of increasing the pattern height includes the substep of controlling the opening of the raster scan pattern to a maximum scan angle at an opening rate.

11. The method of claim 10, wherein the step of increasing the pattern height includes the substep of determining the maximum scan angle based on the height of the symbol, the initial scan angle of the raster scan pattern, and the number of rows initially scanned by the raster scan pattern.

12. The method of claim 11, wherein the step of increasing the pattern height includes the substep of determining the height of the symbol from information contained in the rows of the symbol initially scanned by the raster scan pattern.

13. The method of claim 10, wherein the substep of controlling the opening of the raster scan pattern includes the further substep of determining the opening rate based on the maximum scan angle.

* * * * *